United States Patent
Salehiomran et al.

(10) Patent No.: US 10,727,937 B1
(45) Date of Patent: Jul. 28, 2020

(54) MULTI-LAYER ENCODING OF OPTICAL SIGNALS

(71) Applicant: HUAWEI TECHNOLOGIES CO., LTD., Shenzhen, Guangdong (CN)

(72) Inventors: Ali Salehiomran, Gatineau (CA); Zhiping Jiang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/289,904

(22) Filed: Mar. 1, 2019

(51) Int. Cl.
*H04B 10/071* (2013.01)
*H04B 10/073* (2013.01)

(52) U.S. Cl.
CPC ......... *H04B 10/071* (2013.01); *H04B 10/073* (2013.01)

(58) Field of Classification Search
CPC .................. H04B 10/071; H04B 10/073
See application file for complete search history.

(56) References Cited

U.S. PATENT DOCUMENTS

| | | | | |
|---|---|---|---|---|
| 5,673,282 A * | 9/1997 | Wurst | .................. | H01S 3/13 372/38.09 |
| 5,751,455 A * | 5/1998 | Shibutani | ............ | H04B 10/5051 398/1 |
| 6,005,702 A * | 12/1999 | Suzuki | ................. | H04B 10/505 398/142 |
| 6,236,488 B1 * | 5/2001 | Shimizu | ................... | G01J 11/00 398/154 |
| 7,065,286 B1 | 6/2006 | Lee et al. | | |
| 7,433,604 B1 * | 10/2008 | Kim | ................... | H04B 10/5051 398/183 |
| 9,231,704 B1 * | 1/2016 | Zhou | ..................... | H04B 10/58 |
| 2003/0180055 A1 * | 9/2003 | Azadet | ................. | H04B 10/503 398/183 |
| 2004/0141569 A1 * | 7/2004 | Agazzi | ............... | H04B 10/2575 375/302 |
| 2005/0105913 A1 * | 5/2005 | Ozeki | .................. | H04B 10/077 398/140 |
| 2005/0191060 A1 * | 9/2005 | Gronbach | ............ | H04B 10/505 398/183 |
| 2010/0098436 A1 * | 4/2010 | Mahgerefteh | .... | H04B 10/25137 398/192 |

(Continued)

FOREIGN PATENT DOCUMENTS

| | | |
|---|---|---|
| CN | 102122989 A | 7/2011 |
| EP | 0269448 A2 | 6/1988 |
| WO | 2009051689 A2 | 4/2009 |

OTHER PUBLICATIONS

Kindo, Sudharani et al., Studies on Coding Techniques and It's Application To OTDR, A Project Report Submitted in partial fulfilment of the requirements for the award of the degree of Bachelor of Technology in Electronics and Communication Engineering downloaded on Nov. 1, 2018 (51 pages).

(Continued)

*Primary Examiner* — Mina M Shalaby
(74) *Attorney, Agent, or Firm* — Trop, Pruner & Hu, P.C.

(57) ABSTRACT

In some examples, an apparatus includes a multi-layer code generator to generate codewords based on application of a plurality of layers of encoding, an optical source to produce encoded optical pulses based on the generated codewords, and an optical coupler to propagate the encoded optical pulses to an optical medium.

20 Claims, 6 Drawing Sheets

(56) References Cited

U.S. PATENT DOCUMENTS

| | | | |
|---|---|---|---|
| 2012/0020672 A1* | 1/2012 | Aguren | G01M 11/3154 |
| | | | 398/139 |
| 2013/0163995 A1* | 6/2013 | Uemura | H04B 10/504 |
| | | | 398/136 |
| 2013/0315532 A1* | 11/2013 | Xie | H04B 10/071 |
| | | | 385/28 |
| 2016/0036422 A1* | 2/2016 | Bock | H03K 5/1252 |
| | | | 398/201 |
| 2016/0112139 A1* | 4/2016 | Tanaka | H03F 1/32 |
| | | | 398/43 |
| 2016/0277101 A1 | 9/2016 | Jiang et al. | |
| 2017/0205255 A1* | 7/2017 | Nannipieri | G01D 5/35361 |
| 2017/0222397 A1* | 8/2017 | Tsunoda | H01S 5/042 |
| 2019/0007141 A1* | 1/2019 | Kawata | H04B 10/505 |
| 2019/0234832 A1 | 8/2019 | Li et al. | |

OTHER PUBLICATIONS

Wikipedia, Binary Golay code last edited Oct. 17, 2018 (5 pages).
Nazarathy et al., Real-Time Long Range Complementary Correlation Optical Time Domain Reflectometer, Journal of Lightwave Technology, vol. 7, No. 1 , Jan. 1989 (15 pages).
Wolfram Mathworld, Golay Code downloaded Oct. 19, 2018 (2 pages).
Xiaojing Huang, Simple implementations of mutually orthogonal complementary sets of sequences, University of Wollongong, Australia, 2005 (6 pages).
Wikipedia, Ternary Golay code last edited Jul. 18, 2018 (3 pages).
International Search Report and Written Opinion for PCT/CN2020/077326 dated Apr. 26, 2020 (11 pages).

\* cited by examiner

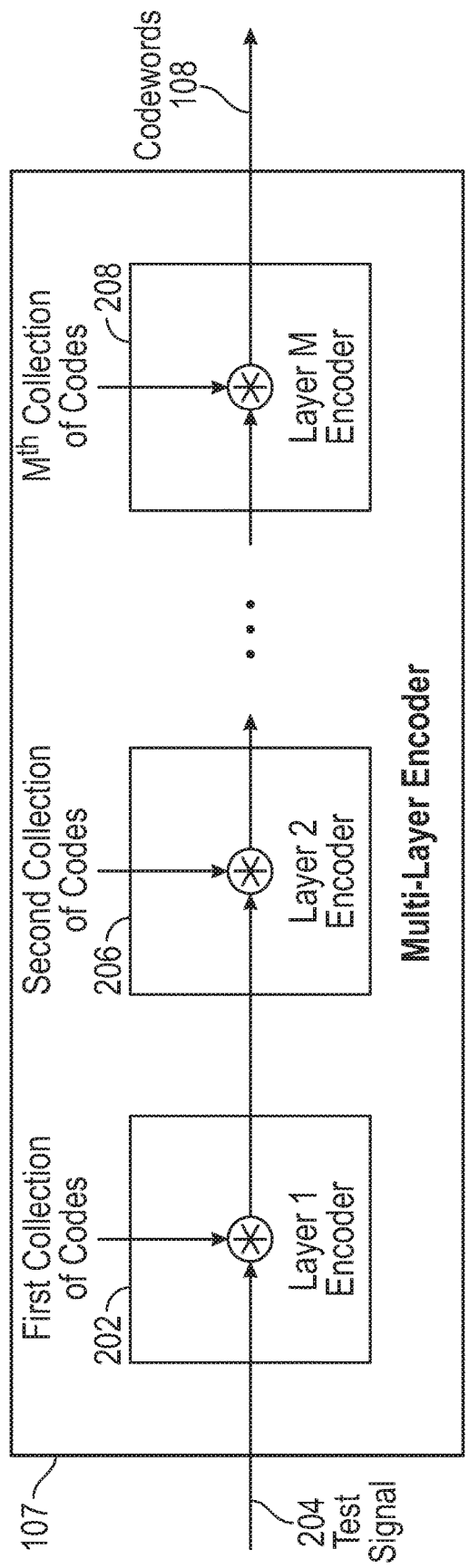
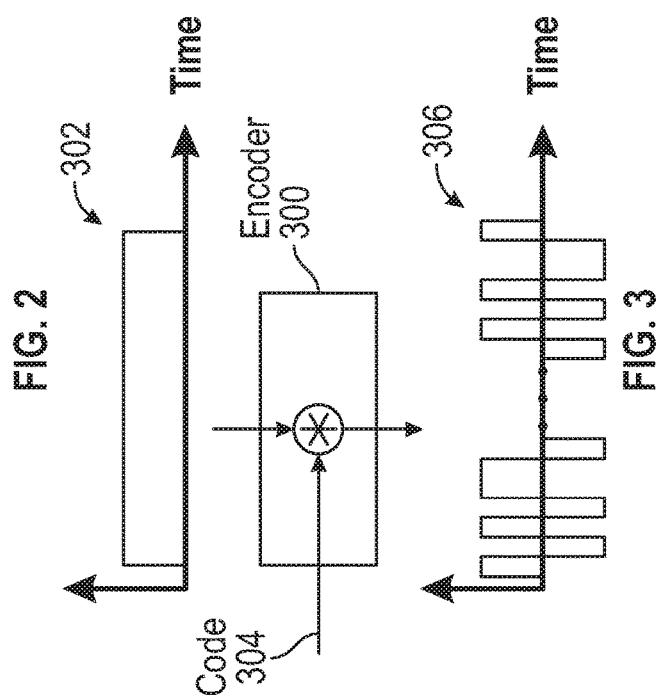
FIG. 2
FIG. 3

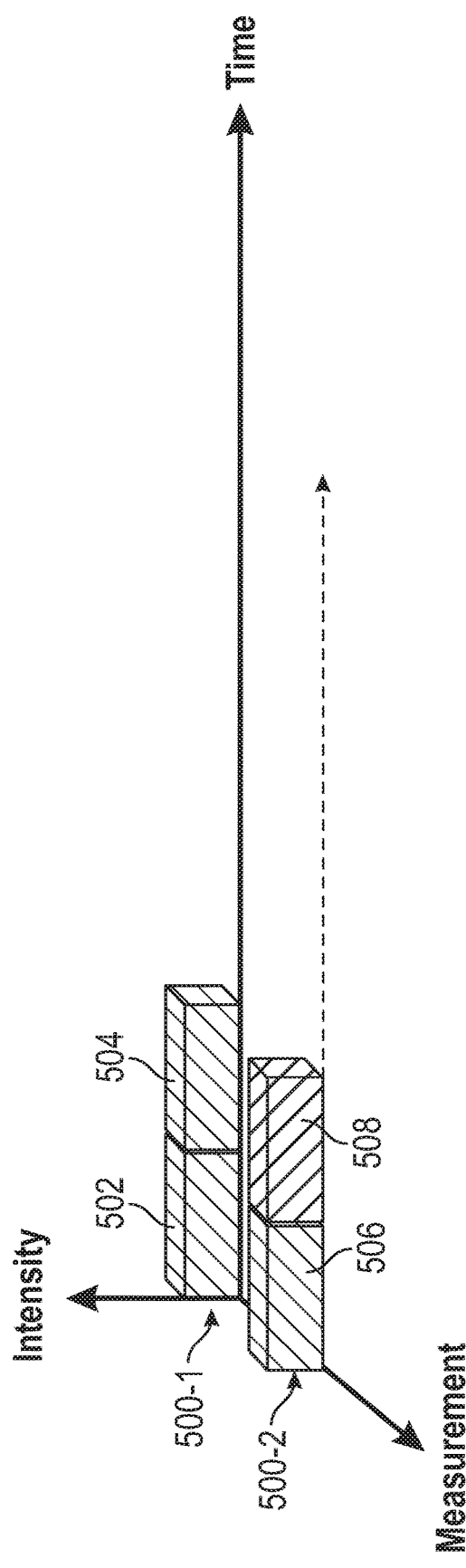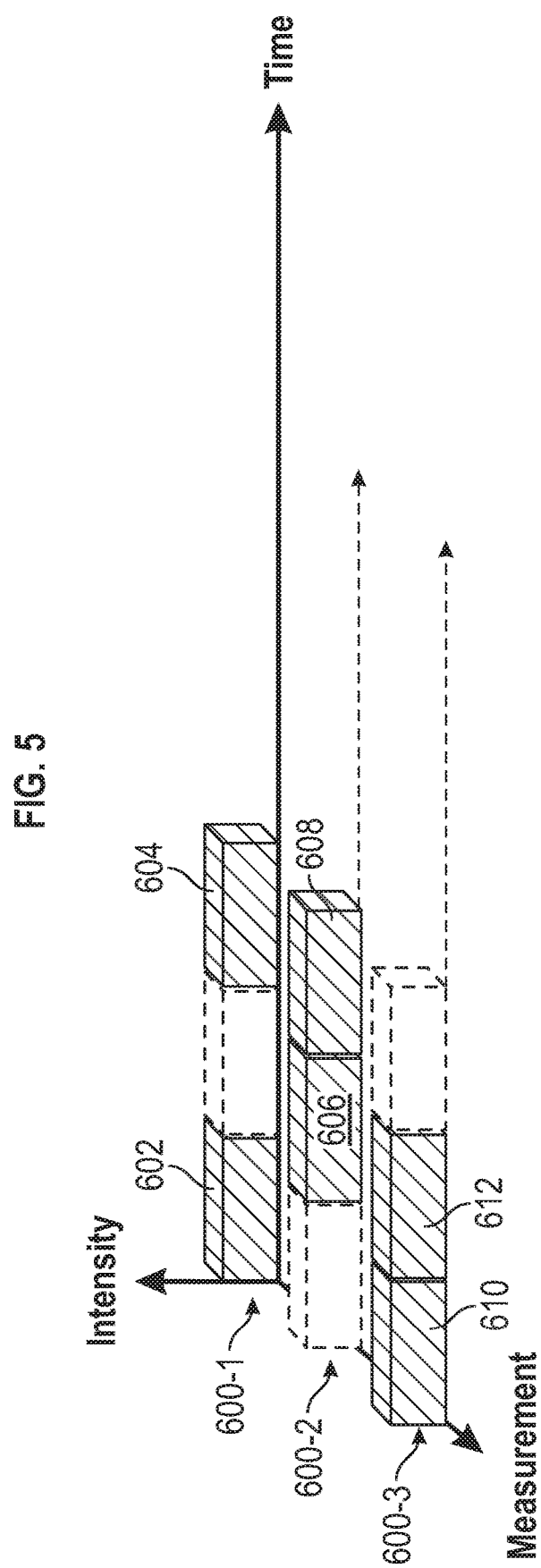

MULTI-LAYER ENCODING OF OPTICAL SIGNALS

BACKGROUND

Information can be transmitted over an optical medium such as an optical fiber or other type of optical medium. The optical medium can be used in an optical communication network, for example.

An optical time domain reflectometer (OTDR) is a measurement device that launches optical probe pulses into an optical medium under test. The light backscattered or reflected by the optical medium under test is analyzed to determine the attenuation loss and reflection profile of the optical medium as a function of distance. The distance to a feature of the optical medium under test is determined by measuring the time involved for an optical signal to travel to the feature and back to the OTDR.

SUMMARY

According to aspects of the present disclosure, to improve the performance of an OTDR, multi-layer encoding is applied that generates codes based on the application of multiple layers of encoding to produce encoded optical pulses that are used for probing an optical medium under test. The multiple layers of encoding include a first layer of encoding applied to a test signal that produces a first set of code words, a second layer of encoding applied to the first set of code words to produce a second set of code words, and so forth. The multi-layer encoding outputs a final set of code words that are used to modulate an optical signal to produce the encoded optical pulses that are transmitted into the optical medium under test.

According to an aspect of the present disclosure, there is provided an apparatus comprising a multi-layer code generator to generate codewords based on application of a plurality of layers of encoding, an optical source to produce encoded optical pulses based on the generated codewords, and an optical coupler to propagate the encoded optical pulses to an optical medium.

According to another aspect of the present disclosure, there is provided an apparatus comprising an interface to receive, from an optical receiver, data representing measurements of reflected light that is responsive to encoded optical pulses transmitted into an optical medium, and a processor to decode the data using a plurality of layers of decoding to recover a target signal that is part of a representation of intensities of reflected light as a function of distance along the optical medium.

According to a further aspect of the present disclosure, there is provided a method performed by an optical time domain reflectometer (OTDR), the method comprising generating codewords based on application of a plurality of layers of encoding, modulating a signal using the codewords to produce encoded optical pulses, transmitting the encoded optical pulses into an optical medium, receiving measurements of reflected light from the optical medium responsive to the encoded optical pulses transmitted into the optical medium, decoding the measurements using a plurality of layers of decoding, and producing, based on an output of the decoding, a representation of intensities of the reflected light as a function of distance along the optical medium.

Optionally, in any of the preceding aspects, in another implementation, the plurality of layers of encoding comprises a sequence of different layers of encoding in which an output of one layer of encoding is provided to an input of another layer of encoding.

Optionally, in any of the preceding aspects, in another implementation, the plurality of layers of encoding comprises a first layer encoding on an input signal, and a second layer encoding on an encoded output of the first layer encoding.

Optionally, in any of the preceding aspects, in another implementation, the plurality of layers of encoding further comprises a third layer encoding on an encoded output of the second layer encoding.

Optionally, in any of the preceding aspects, in another implementation, wherein the first layer encoding uses a first type of code, and the second layer encoding uses a second type of coding different from the first type of coding.

Optionally, in any of the preceding aspects, in another implementation, the encoded output of the first layer encoding comprises a first set of codewords, and the second layer encoding is to further encode each codeword of the first set of codewords to produce a second set of codewords that is larger than the first set of codewords.

Optionally, in any of the preceding aspects, in another implementation, a modulator modulates a signal using the generated codewords to produce the encoded optical pulses.

Optionally, in any of the preceding aspects, in another implementation, an optical receiver receives reflected light from the optical medium through the optical coupler, and a decoder decodes measurements of the reflected light from the optical receiver using a plurality of layers of decoding.

Optionally, in any of the preceding aspects, in another implementation, the plurality of layers of decoding comprises a first layer decoding that decodes the measurements, and a second layer decoding that decodes a decoded output of the first layer decoding.

Optionally, in any of the preceding aspects, in another implementation, the plurality of layers of decoding further comprises a third layer decoding that decodes a decoded output of the second layer decoding.

Optionally, in any of the preceding aspects, in another implementation, the decoder produces an output that includes a representation of intensities of the reflected light as a function of distance along the optical medium.

Optionally, in any of the preceding aspects, in another implementation, a layer of the plurality of layers of encoding applies a coding technique selected from among: complementary correlation coding, linear coding, mutual orthogonal coding, and bi-orthogonal coding.

Optionally, in any of the preceding aspects, in another implementation, the plurality of layers of decoding comprises a sequence of different layers of decoding in which an output of one layer of decoding is provided to an input of another layer of decoding.

Optionally, in any of the preceding aspects, in another implementation, the decoded output of the first layer decoding comprises a first set of codewords, and the second layer decoding is to generate a decoded output comprising a second set of codewords that is smaller than the first set of codewords.

Optionally, in any of the preceding aspects, in another implementation, a last layer of the plurality of layers of decoding produces the target signal.

In further aspects, additional or alternative features are included.

DESCRIPTION OF THE DRAWINGS

Some implementations of the present disclosure are described with respect to the following figures.

FIG. 2 is a block diagram of a multi-layer encoder according to some implementations of the present disclosure.

FIG. 3 illustrates an encoder applying encoding on an optical pulse to produce encoded optical pulses, according to some examples.

FIGS. 5 and 6 are timing diagrams of measurements received in response to encoded optical pulses transmitted into an optical medium under test.

Figure 1:
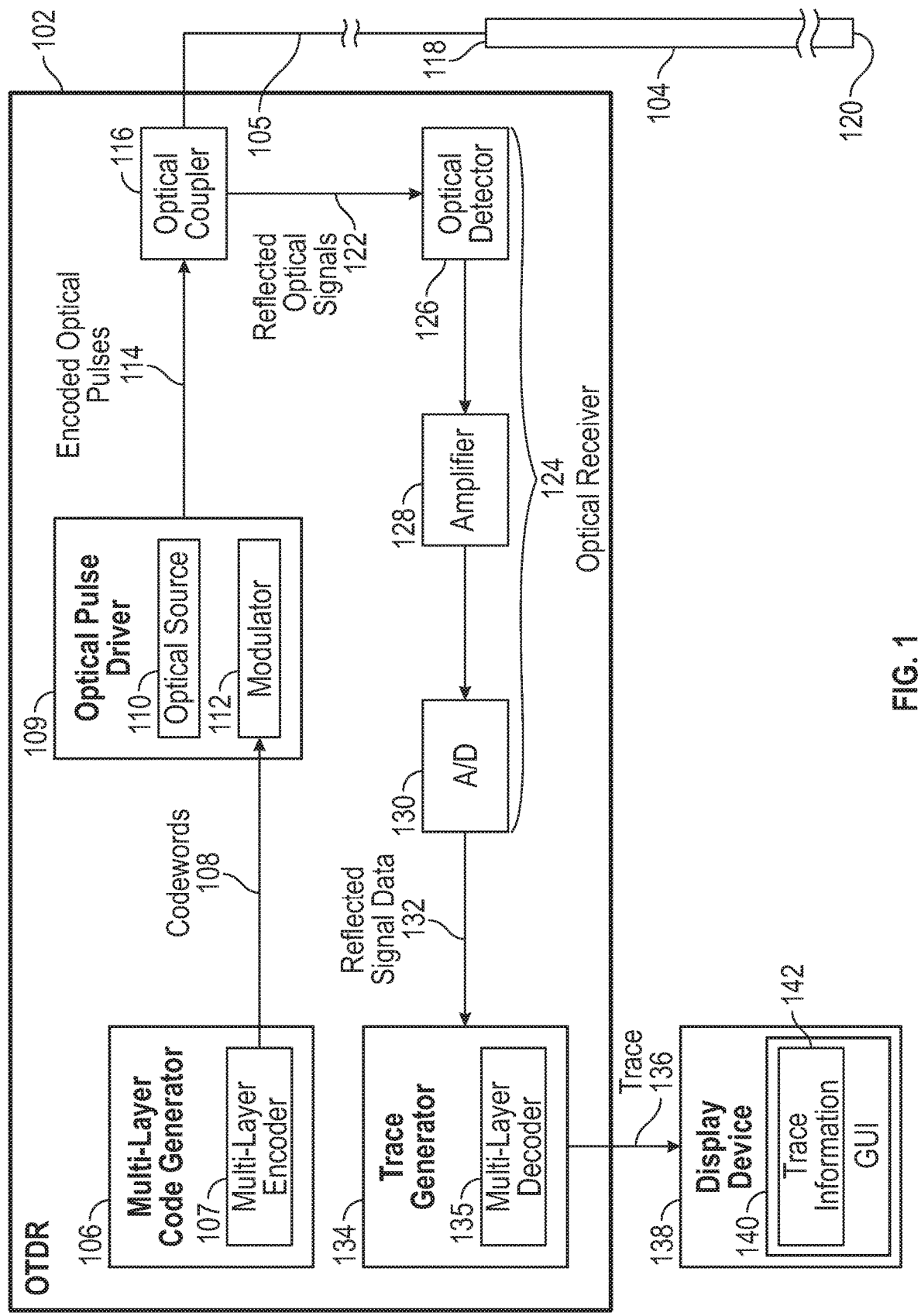
FIG. 1 is a block diagram of a system that includes an optical time domain reflectometer (OTDR) according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An optical signal transmitted by an optical time domain reflectometer (OTDR) into an optical medium under test is reflected from different points along the optical medium. The reflection of light can be due to Rayleigh backscattering or Fresnel reflection, for example. The optical medium under test can include an optical fiber, an optical waveguide, or any other medium capable of communicating an optical signal.

By measuring reflected light from the optical medium under test, the OTDR can be used to determine characteristics of the optical medium. The determined characteristics can be used to identify locations of anomalies along the optical medium, or to characterize the profile of the optical medium along its length.

Anomalies can be due to various factors, including any or some combination of the following: a break or other discontinuity in the optical medium, an uneven or scratched surface in the optical medium, an optical connector that connects portions of the optical medium, a splice to connect portions of the optical medium, a bend of the optical medium, and so forth.

A trace or other representation of optical measurements acquired by the OTDR as a function of distance along the optical medium under test can be derived. An optical measurement can be in the form of a measured intensity of reflected light acquired at a respective time (which can be translated to a corresponding distance along the optical medium). In some examples, the measured intensity of the reflected light can include an optical power of the reflected light.

If no anomalies are present along the optical medium, the measured reflected optical power will gradually attenuate with distance along the optical medium. However, locations of the optical medium at which anomalies are present show up as spikes, dips, or other deviations in the measured reflected optical power as compared to an expected reflected optical power on the trace.

An OTDR is associated with various performance metrics that indicate the effectiveness of the OTDR. Examples of performance metrics include a dynamic range, a spatial resolution, and a dead zone.

The dynamic range provides a measure of the range of the OTDR, i.e., a maximum length of the optical medium under test that the OTDR pulse can reach for the purpose of detecting a feature of the optical medium at the maximum length. A "feature" refers to any portion of the optical medium that can cause reflection of light (Rayleigh backscattering, Fresnel reflection, etc.) back to the OTDR. The dynamic range is represented as a decibel (dB) difference between an initial power level reflected from the optical medium and a value equal to the noise floor of an optical detector in the OTDR. This dB difference represents a maximum loss that can be detected by the OTDR in the form of backscattering at a given noise level.

Since the dynamic range of the OTDR is related to the power injected into the optical medium under test, increasing a pulse width of an optical pulse (which increases the injected optical power) transmitted into the optical medium can improve the dynamic range. A pulse width of the optical pulse refers to an amount of time during which an optical source of the OTDR is on. A longer optical pulse carries more energy. However, increasing the pulse width of the injected optical pulse can degrade the spatial resolution of the OTDR, which can lead to increased uncertainty in spatial localization of events in the optical medium.

The spatial resolution of the OTDR refers to the minimum distance between events in the optical medium under test that can be detected by the OTDR. For example, a spatial resolution of 2 centimeters (cm) means that the OTDR is able to identify events that are 2 cm or more apart along the optical medium. The OTDR would not be able to detect distinct events that are less than 2 cm apart in the optical medium. It is desired that the OTDR have finer spatial resolution over a coarser spatial resolution.

To overcome the tradeoff between the dynamic range and the spatial resolution of an OTDR, coding techniques have been applied in which coding is applied to produce an optical signal that is to be transmitted into an optical medium under test. More specifically, code words produced by the coding technique are used to modulate optical pulses (using amplitude modulation or phase modulation, for example), and the modulated optical pulses are transmitted into the optical medium. Examples of coding techniques include any of the following: complementary correlation coding (e.g., Golay coding), linear coding (e.g., simplex coding), mutual orthogonal coding (e.g., mutually orthogonal complementary sets of sequences), bi-orthogonal coding, and so forth.

An encoding technique uses a code (or more generally, a collection of codes, where the collection can include one or more codes) to encode a signal. A code in the collection of codes can have a specified length. By applying encoding, instead of sending one long optical pulse, a collection of shorter optical pulses of varying amplitudes (produced based on the encoding of the optical pulse) are instead sent into the optical medium under test. The number of optical pulses in the collection depends on the length of the code. The use of the coded optical pulses increases the power of the optical signal, while still providing relatively good spatial resolution that satisfies a target specification (e.g., a target spatial resolution of less than a threshold distance).

In the presence of strong reflected light (e.g., reflected light having a high optical power), use of coding can produce a dead zone. A dead zone refers to a length of time during which an optical detector of the OTDR is temporarily unable to effectively detect the next reflection event. Strong reflected light may result in the presence of certain physical characteristics of the optical medium under test. After receiving strong reflected light, the optical detector may take some amount of time to recover before the optical detector can again meaningfully detect the next reflective event. The length of the dead zone can correspond to the length of the code used; for example, the longer the length of the code, the longer the dead zone. The dead zone effect can be exacerbated by distortion caused by a non-linear response of components of the OTDR to a high amount of reflected light. For example, a strong reflected light can cause saturation effects in the optical detector of the OTDR and/or cause clipping of an analog-to-digital converter (ADC) of the OTDR (clipping causes the ADC to output a maximum or minimum value of the ADC despite a continued increase or decrease in the input to the ADC).

Due to the dead zone effect, an OTDR cannot simply increase the length of a code for increasing optical signal power (and thus the dynamic range of the OTDR), as the increased code length can cause an increased dead zone. Although linear codes may be used to reduce optical reflection power, the measurement time for a linear code can be longer, which may not be desirable.

In accordance with some implementations of the present disclosure, instead of merely increasing a code length of a code to increase optical signal power, an OTDR performs multi-layer encoding in which encoded optical pulses transmitted into an optical medium under test are generated based on application of multiple layers of encoding. The multi-layer encoding applies successive M layers of encoding, where M≥2. A 2-layer encoding includes performing a first layer encoding using a first collection of codes of a test signal (a signal used to produce optical pulses to be injected into the optical medium under test), and a second layer encoding using a second collection of codes of the encoded output of the first layer encoding. A 3-layer encoding includes performing a first layer encoding using a first collection of codes of a test signal, a second layer encoding using a second collection of codes of the encoded output of the first layer encoding, and a third layer encoding using a third collection of codes of the encoded output of the second layer encoding.

A "collection of codes" can refer to a collection that includes just one code or more than one code.

By using multiple layers of encoding, the code length of a code used in each layer of encoding can be relatively short to reduce the dead zone effect. However, the multiple layers of encoding produce a larger number of code words that when used to encode the test signal to produce encoded optical test pulses injected into an optical medium under test effectively increases the optical signal power, while still achieving a target level of spatial resolution.

The OTDR receives measurements corresponding to reflected optical signals that are reflected from the optical medium under test in response to the encoded optical pulses produced according to the multi-layer encoding. The OTDR converts the received measurements into reflected signal data in the digital domain. The OTDR applies multi-layer decoding on the reflected signal data to recover a trace or other representation of intensities of the reflected optical signals as a function of distance along the length of the optical medium. The multi-layer decoding applies multiple (M) layers of decoding in sequence (in an order that is the reverse of the layers of encoding applied by the multi-layer encoding or in another order), to recover a target signal that corresponds to a reflected optical signal from the optical medium under test. For example, a 2-layer decoding includes performing a second layer decoding using the second collection of codes of a reflected signal (a signal corresponding to a reflected optical signal received from the optical medium under test), and a first layer decoding using the first collection of codes of the decoded output of the second layer decoding.

FIG. 1 is a block diagram of an example arrangement that includes an OTDR 102 for transmitting an optical signal into an optical medium under test 104, and to receive reflected optical signals from the optical medium under test 104.

The OTDR 102 includes a multi-layer code generator 106 including a multi-layer encoder 107 that applies the multi-layer encoding according to some implementations of the present disclosure. Based on the multi-layer encoding applied by the multi-layer encoder 107, the code generator 106 produces codewords 108 (also referred to as "code sequences") that are provided to an optical pulse driver 109. As used here, a "codeword" or "code sequence" refers to any collection of bits, symbols, or any other information that can be used to perform modulation of a signal.

The optical pulse driver 109 includes an optical source 110, such as a laser device (including one or more laser diodes, for example) or any other type of a source of an optical signal. The optical pulse driver 109 further includes a modulator 112 to apply modulation based on the codewords 108 produced by the code generator 106. The modulator 112 can perform modulation in either the electrical domain or the optical domain. If the modulation is applied in the electrical domain, the modulator 112 modulates, using the codewords 108, an electrical test signal (used for producing an optical signal for probing the optical medium under test 104). The modulation performed by the modulator 112 can include any or some combination of the following: amplitude modulation, phase modulation, and so forth. The modulation of the electrical test signal produces modulated electrical pulses that can then be provided to the optical source 110 to produce corresponding encoded optical pulses 114 that are output by the optical pulse driver 109.

If the modulation applied by the modulator 112 is performed in the optical domain, the modulator 112 receives an optical test signal from the optical source 110, and applies modulation on the optical test signal to produce the encoded optical pulses 114.

The encoded optical pulses 114 are passed through an optical coupler 116 and directed through an optical link 105 (e.g., including an optical fiber, an optical waveguide, etc.) to a proximal end 118 of the optical medium under test 104. Examples of the optical coupler 116 can include any or some combination of the following: a beam splitter, a wave bridge, an optical circulator, and so forth.

The encoded optical pulses 114 are propagated along the length of the optical medium under test 104 towards a distal end 120 of the optical medium 104. The proximal end 118 of the optical medium 104 is the end that is closest to the OTDR 102, while the distal end 120 is the end that is farthest away from the OTDR 102.

In response to the encoded optical pulses 114, reflected optical signals 122 from various points along the optical medium 104 are propagated back along the optical medium 104 towards the proximal end 118 of the optical medium 104. The reflected optical signals 122 are passed through the optical coupler 116 to an optical receiver 124 of the OTDR 102.

The reflected optical signals 122 are detected by an optical detector 126. The optical detector 126 can include one or more photodiode photodiodes or any other type of a detector that can detect optical signals.

The optical detector 126 converts the reflected optical signals 122 into electrical signals that are provided to an amplifier 128. The amplifier 128 amplifies the electrical signals from the optical detector 126 into amplified signals (analog electrical signals) that are provided to an analog-to-digital (A/D) converter 130. The A/D converter 130 converts the analog electrical signals into a reflected signal data 132. The reflected signal data 132 is output by the A/D converter 130 to a trace generator 134 that includes a multi-layer decoder 135. The multi-layer decoder 135 applies multi-layer decoding on the reflected signal data 132 according to some implementations of the present disclosure.

Based on the multi-layer decoding on the reflected signal data 132, the multi-layer decoder 135 produces a target signal corresponding to a reflected optical signal at a respective point of the optical medium under test 104. Multiple target signals can be produced by the multi-layer decoder 135 for respective multiple points of the optical medium 104. The trace generator 134 collects the target signals into a trace (OTDR trace) or other representation 136 of optical intensities as a function of distance along the length of the optical medium 104. In some examples, multiple OTDR traces may be generated based on the reflected signal data 132.

The trace or other representation 136 can be provided to a display device 138 for display to a user. The display device 138 can display, in a graphical user interface (GUI) 140, for example, trace information 142 representing the trace 136.

In other examples, the trace or other representation 136 can be communicated to another entity, which can include a user, a program, or a machine, or the trace or other representation 136 can be stored into a data repository for a later retrieval.

The multi-layer code generator 106 and the trace generator 134 can be implemented using a hardware processing circuit or a combination of a hardware processing circuit and machine-readable instructions. A hardware processing circuit can include any or some combination of a microprocessor, a core of a multi-core microprocessor, a microcontroller, a programmable integrated circuit, a programmable gate array, a digital signal processor, or another hardware processing circuit. Machine-readable instructions can be part of software and/or firmware executable on the hardware processing circuit.

FIG. 2 is a block diagram of the multi-layer encoder 107 according to some examples of the present disclosure. Generally, a multi-layer encoder can include M layers of encoders connected in sequence, where M≥2. The example multi-layer encoder 107 shown in FIG. 2 assumes that M≥3. The multi-layer encoder 107 includes a layer 1 encoder 202 that applies encoding on an input test signal 204. The layer 1 encoder 202 produces an encoded output that is provided to a layer 2 encoder 206, which applies encoding on the encoded output from the layer 1 encoder 202. The encoded output from the layer 2 encoder 206 is provided to the encoder of the next layer.

The different layers of encoders of the multi-layer encoder 107 can use different types of coding. Different types of coding can refer to use of different categories of coding, e.g., Golay coding, simplex coding, mutual orthogonal coding, bi-orthogonal coding, etc. Alternatively, different types of coding can also refer to use of different lengths of codes (in other words, one encoder using Golay codes of a first length is considered to apply a different type of coding than another encoder using Golay codes of a different second length).

The final encoding stage of the multi-layer encoder 107 is a layer M encoder 208, which receives an encoded output from the encoder in the previous layer. The layer M encoder 208 applies encoding on the received encoded output, and produces the codewords 108 that are used for performing modulation for producing the encoded optical pulses 114 of FIG. 1.

In the example of FIG. 2, each encoder 202, 206, and 208 performs encoding by applying convolution of an input of the encoder with a respective collection of codes. In FIG. 2, the symbol ⊙ is a convolution operator. The layer 1 encoder 202 encodes the input test signal with a first collection of codes to produce a first encoded output that includes a first set of codewords. The layer 2 encoder 206 encodes the codewords of the first encoded output with a second collection of codes to produce a second encoded output that includes a second set of codewords that is larger than the first set of codewords (i.e., the second set includes more codewords than the first set). The layer M encoder 208 encodes codewords of the (M−1)th encoded output from a layer (M−1) encoder, to produce the codewords 108. Each collection of codes used by a respective encoder depends on the encoding technique applied by the encoder, such as a complementary correlation coding technique, a linear coding technique, a mutual orthogonal coding technique, a bi-orthogonal coding technique, and so forth.

FIG. 3 shows an example of an encoding that can be applied by an encoder 300, which can be the layer 1 encoder 202 of FIG. 2. FIG. 3 shows an example input signal pulse 302 in a timing diagram, where the horizontal axis represents time and the vertical access represents intensity (e.g., signal amplitude, power, etc.).

The encoder 300 convolves a code 304 with the signal pulse 302 to produce an encoded output 306. The encoded output 306 includes a series of signal pulses over time, where the signal pulses have varying intensities. In the example of FIG. 3, the encoded output 306 includes signal pulses that have one of three possible amplitudes: +1, 0, −1. The set of signal pulses of the encoded output 306 represent a codeword produced by the encoder 300 based on applying the code 304. If the encoder 300 applies encoding using multiple codes on the input signal pulse 302, then multiple corresponding sets of encoded signal pulses (i.e., multiple codewords) would be created.

If the encoder 300 is a layer i encoder (where i>1), then the input to the encoder 300 includes the codeword(s) from a previous layer encoder.

In some examples, with an M-layer encoder (including M layers), for each layer i (where i=1 to M), the respective collection of codes, $C_i(t)$, can be represented as:

$$C_i(t) = \sum_{n=0}^{N_t-1} a_{in}\delta(t - nT_i), \quad \text{(Eq. 1)}$$

where t represents time, $a_{in}$ represents the $n^{th}$ code word of layer i, and $\delta(t)$ represents the Dirac delta function. Each layer includes a collection of codes $\{a_{in}\}$ of length $N_i$, where n=0 to $N_i-1$ It is assumed that the test signal 204, represented as P(t) (e.g., a rectangular pulse) has a duration T). For the Dirac delta function, $\delta(t-nT_i)$, in layer 1, $T_1=T$. More generally, in layer i, $T_i=T \times N_1 \times \ldots \times N_{i-1}$. For i>1, the generalized delay can be $T_i \geq T_{i-1} \times N_{i-1}$.

With the example given above, the layer 1 encoder 202 produces an encoded output $P_1(t)$ based on the input P(t) as follows:

$$P_1(t) = P(t) \otimes C_1(t) = \sum_{n=0}^{N_1-1} a_{1n} P(t-nT), \quad \text{(Eq. 2)}$$

where $\otimes$ denotes convolution. In other words, according to Eq. 2, the encoding applied by the layer 1 encoder 202 convolves the input P(t) with the first collection of codes represented as $C_1(t)$.

The encoded output $P_1(t)$ produced by the layer 1 encoder 202 is an input to the layer 2 encoder 206, which convolves $P_1(t)$ with the second collection of codes $C_2(t)$ as follows:

$$P_2(t) = P_1(t) \otimes C_2(t) = \sum_{m=0}^{N_2-1} a_{2m} P_1(t - mN_1T), \quad \text{(Eq. 3)}$$

$$P_2(t) = P(t) \otimes C_1(t) \otimes C_2(t) = \sum_{m=0}^{N_2-1} \sum_{n=0}^{N_1-1} a_{2m} a_{1n} P(t - nT - mN_1T). \quad \text{(Eq. 4)}$$

The remaining encoders of the M-layer encoder can apply similar encoding using encoded outputs from respective encoders in previous layers.

The following describes an example of a 2-layer encoder where both the layer 1 encoder and the layer 2 encoder applies Golay encoding. The collection of codes of layer i is referred to as a Golay complementary sequence, and includes a pair of Golay codes $GC_{i1}$ and $GC_{i2}$, which satisfy the following:

$$GC_{i1}*GC_{i1} + GC_{i2}*GC_{i2} = 2N_i \delta(n), \quad \text{(Eq. 5)}$$

where $N_i$ is code length and * denotes correlation.

The pair of Golay codes used by the layer 1 encoder can be different from the pair of Golay codes used by the layer 2 encoder (e.g., the lengths of the Golay codes in the different layers can be different).

The layer 1 encoder produces, from the input test signal, P(t), two codewords, and the layer 2 encoder produces, from the two codewords produced by the layer 1 encoder, four codewords (or code sequences): $\{P_{2j}(t)\}$, j=1 to 4. These four code words are then used for modulating a signal that is used for producing encoded optical pulses for transmission into an optical medium under test.

The code elements of each Golay code of layer i ($GC_{ij}$) can be denoted as $gc_{ik}(n)$, n=$\{1, \ldots, N_i\}$, k=$\{1, 2\}$, i=$\{1, 2\}$. The four codewords produced by the layer 2 encoder can be expressed as:

$$P_{21}(t) = \sum_{m=0}^{N_2-1} \sum_{n=0}^{N_1-1} gc_{11}(n) gc_{21}(m) P(t - nT - mN_1T), \quad \text{(Eq. 6)}$$

$$P_{22}(t) = \sum_{m=0}^{N_2-1} \sum_{n=0}^{N_1-1} gc_{11}(n) gc_{22}(m) P(t - nT - mN_1T), \quad \text{(Eq. 7)}$$

$$P_{23}(t) = \sum_{m=0}^{N_2-1} \sum_{n=0}^{N_1-1} gc_{12}(n) gc_{21}(m) P(t - nT - mN_1T), \quad \text{(Eq. 8)}$$

$$P_{24}(t) = \sum_{m=0}^{N_2-1} \sum_{n=0}^{N_1-1} gc_{12}(n) gc_{22}(m) P(t - nT - mN_1T). \quad \text{(Eq. 9)}$$

Figure 4:
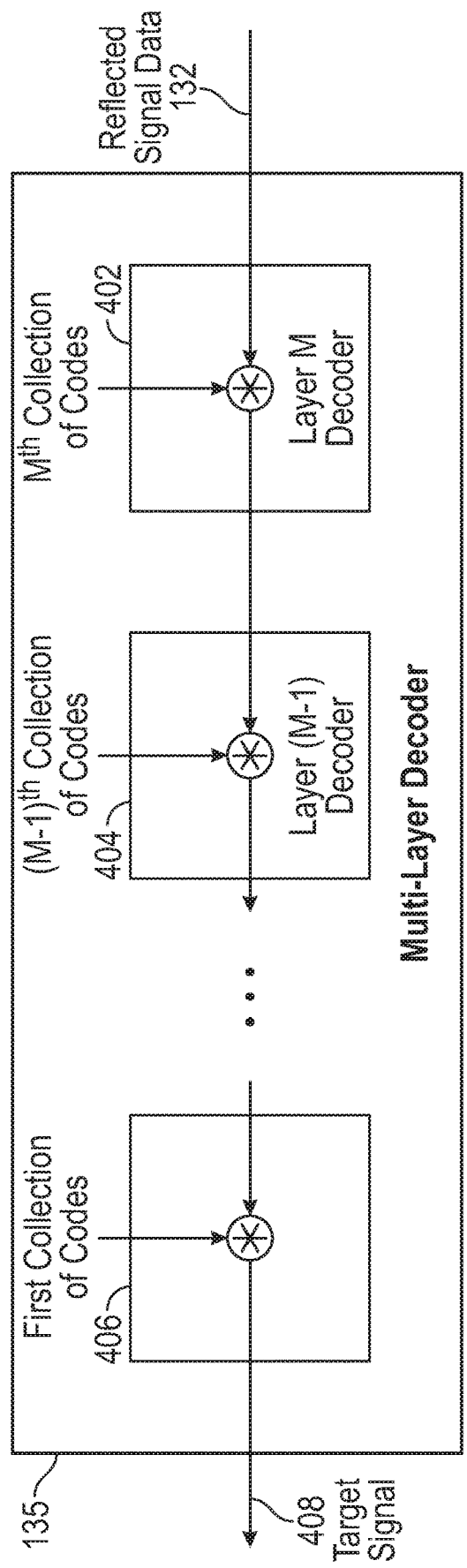
FIG. 4 is a block diagram of a multi-layer decoder according to some implementations of the present disclosure.

FIG. 4 shows an example of the multi-layer decoder 135 according to some implementations of the present disclosure. Generally, a multi-layer decoder can include M layers of decoders connected in sequence, where M≤2.

In the example of FIG. 4, it is assumed that M≥3. The reflected signal data 132 (as output by the optical receiver 124 of FIG. 1) is provided as an input to a layer M decoder 402 (the first stage of the multi-layer decoder 135).

Note that the number of optical measurements represented by the reflected signal data 132 used by the multi-layer decoder 135 depends on the number of codewords produced by the multi-layer encoder 107 that is used to produce the encoded optical pulses 114 launched into the optical medium under test 104. If the number of codewords produced by the multi-layer encoder 107 is L, then the number of optical measurements that are used in the multi-layer decoding is equal to L (or more generally, is based on L). The multiple optical measurements are used at the same time in the multi-layer decoding.

The layer M decoder 402 decodes the reflected signal data 132 using the Mth collection of codes. The layer M decoder 402 produces a decoded output (including a set of codewords) that is supplied to a layer (M−1) decoder 404, which decodes the decoded output from the layer M decoder 402 using an (M−1)th collection of codes. The layer (M−1) decoder 404 produces a decoded output including another set of codewords that is smaller than the set of codewords output by the layer M decoder 402.

The decoded output from the layer (M−1) decoder 404 is supplied to the decoder in the next layer. The final stage of the multi-layer decoder 135 is the layer 1 decoder 406, which receives a decoded output from the decoder in the previous layer. The layer 1 decoder 406 decodes the decoded output using the first collection of codes, and produces a target signal 408 that is part of the trace or other representation 136 produced by the trace generator 134 of FIG. 1.

Depending on the type of encoding used in the layers of the multi-layer encoder 107, a single trace or multiple OTDR traces may be produced. For example, if the encoders of the different layers apply Golay encoding and/or simplex encoding, then a single OTDR trace is produced. On the other hand, if an encoder in a layer of the multi-layer encoder 107 applies mutual orthogonal coding, then the number of OTDR traces generated is based on the order of the mutual orthogonal coding.

Although FIG. 4 shows a specific sequence of decoders of the M layers, it is noted that in other examples, the sequence of decoders in the different layers can be changed.

The following describes an example where a 2-layer decoder is used, with each of the layer 1 decoder and layer 2 decoder using Golay decoding (corresponding to the Golay encoding used by the example 2-layer encoder discussed further above).

The example 2-layer encoder discussed above produced four codewords (or code sequences) $\{P_{2j}(t)\}$, j=1 to 4.

Corresponding to the encoded optical pulses produced based on the four codewords, four measurements, $\{R_{2j}(t), j=1 \text{ to } 4\}$, can be used in the multi-layer decoding:

$$R_{2j}(t) = P_{2j}(t) \otimes b(t), j=1 \text{ to } 4, \quad (Eq. 10)$$

where b(t) represents the target signal 408 to be reproduced by the OTDR.

First, layer 2 decoder decodes, using the second pair of Golay codes ($GC_{21}$ and $GC_{22}$), the reflected signal data 132 representing the four measurements as follows:

$$R_{11} = R_{21}*GC_{21} + R_{22}*GC_{22} = 2N_2 GC_{11} \otimes b(t), \quad (Eq. 11)$$

$$R_{12} = R_{23}*GC_{21} + R_{24}*GC_{22} = 2N_2 GC_{12} \otimes b(t). \quad (Eq. 12)$$

In Eqs. 11 and 12, $N_2$ represents the code length used by the layer 2 decoder.

Next, the layer 1 decoder decodes, using the first pair of Golay codes ($GC_{11}$ and $GC_{12}$), the output of the layer 2 decoder as follows:

$$R = R_{11}*GC_{11} + R_{12}*GC_{12} = 4N_1 N_2 b(t). \quad (Eq. 13)$$

In Eq. 13, $N_1$ represents the code length used by the layer 1 decoder. From Eq. 13, the target signal b(t) can be recovered.

FIG. 5 is a timing diagram that shows two measurements 500-1 and 500-2 of reflected signals from an optical medium under test responsive to encoded optical pulses produced based on the four codewords output by the 2-layer encoder that applied Golay coding in each of layers 1 and 2. The vertical axis represents intensity, a first horizontal axis represents time, and a second horizontal axis represents measurement. The Golay codes used by the layer 1 encoder includes a pair of codes GC-1 and GC-2.

FIG. 5 shows the two measurements 500-1 and 500-2 responsive to layer 2 encoding applied on encoded pulses produced by the first Golay code GC-1 of the layer 1 encoder. The first measurement 500-1 includes sub-measurement portions 502 and 504, and the second measurement 500-2 includes sub-measurement portions 506 and 508. In the example of FIG. 5, each rectangular cube 502, 504, 506, and 508 represents a sub-measurement produced based on encoded optical pulses generated using a codeword produced by the first Golay code GC-1 of the layer 1 encoder. It is assumed for the sake of simplicity that the layer 2 encoder applies the following simple codes:

$$\begin{bmatrix} +1 & +1 \\ +1 & -1 \end{bmatrix},$$

where $\{+1, +1\}$ in the first row of the foregoing matrix is a simple first Golay code applied by the layer 2 encoder, and $\{+1, -1\}$ in the second row of the foregoing matrix is a simple second Golay code applied by the layer 2 encoder. The encoding applied by the first Golay code $\{+1, +1\}$ produces the sub-measurement portions 502 and 504 of the first measurement 500-1, and the encoding applied by the second Golay code $\{+1, -1\}$ produces the sub-measurement portions 506 and 508 of the second measurement 500-2.

A similar timing diagram can show two additional measurements responsive to layer 2 encoding applied on encoded pulses produced by the second Golay code GC-1 of the layer 1 encoder.

The four measurements (500-1, 500-2 for GC-1 and two other measurements for GC-2) are processed by a 2-layer decoder that applies Golay decoding using a layer 2 decoder, and Golay decoding using a layer 1 decoder.

As another example, a 2-layer encoder can include a layer 1 encoder that applies Golay encoding (using a pair of Golay codes GC-1 and GC-2), and a layer 2 encoder that applies simplex encoding. In such an example, the number of codewords output by the layer 2 encoder is 2×N, where N is the length of the simplex code applied by the layer 2 encoder. FIG. 6 is a timing diagram that shows three measurements 600-1, 600-2, and 600-3, based on encoded optical pulses produced by applying simplex encoding by the layer 2 encoder on optical pulses produced by the first Golay code GC-1 of the layer 1 encoder (in an example where the simplex code used has length N=3).

A similar timing diagram can show three more measurements based on encoded optical pulses produced by applying simplex encoding by the layer 2 encoder on optical pulses produced by the second Golay code GC-2 of the layer 1 encoder.

It is assumed for the sake of simplicity that the layer 2 encoder applies the following simple codes:

$$\begin{bmatrix} 1 & 0 & 1 \\ 0 & 1 & 1 \\ 1 & 1 & 0 \end{bmatrix},$$

where each row of the foregoing matrix represents a respective simplex code.

The first measurement 600-1 includes sub-measurement portions 602 and 604 (responsive to encoded optical pulses produced by applying the simplex code $\{1, 0, 1\}$ on a codeword produced by the first Golay code GC-1 of the layer 1 encoder), the second measurement 600-2 includes sub-measurement portions 606 and 608 (responsive to encoded optical pulses produced by applying the simplex code $\{0, 1, 1\}$ on a codeword produced by the first Golay code GC-1 of the layer 1 encoder), and the third measurement 600-3 includes sub-measurement portions 610 and 612 (responsive to encoded optical pulses produced by applying the simplex code $\{1, 1, 0\}$ on a codeword produced by the first Golay code GC-1 of the layer 1 encoder). The dashed blank blocks represent time intervals during which an encoded optical pulse was not transmitted into an optical medium under test. As a result, no measurements are received during the time intervals represented by the dashed blank blocks.

The six measurements are processed by a 2-layer decoder that applies simplex decoding using a layer 2 decoder, and Golay decoding using a layer 1 decoder.

Figure 7:
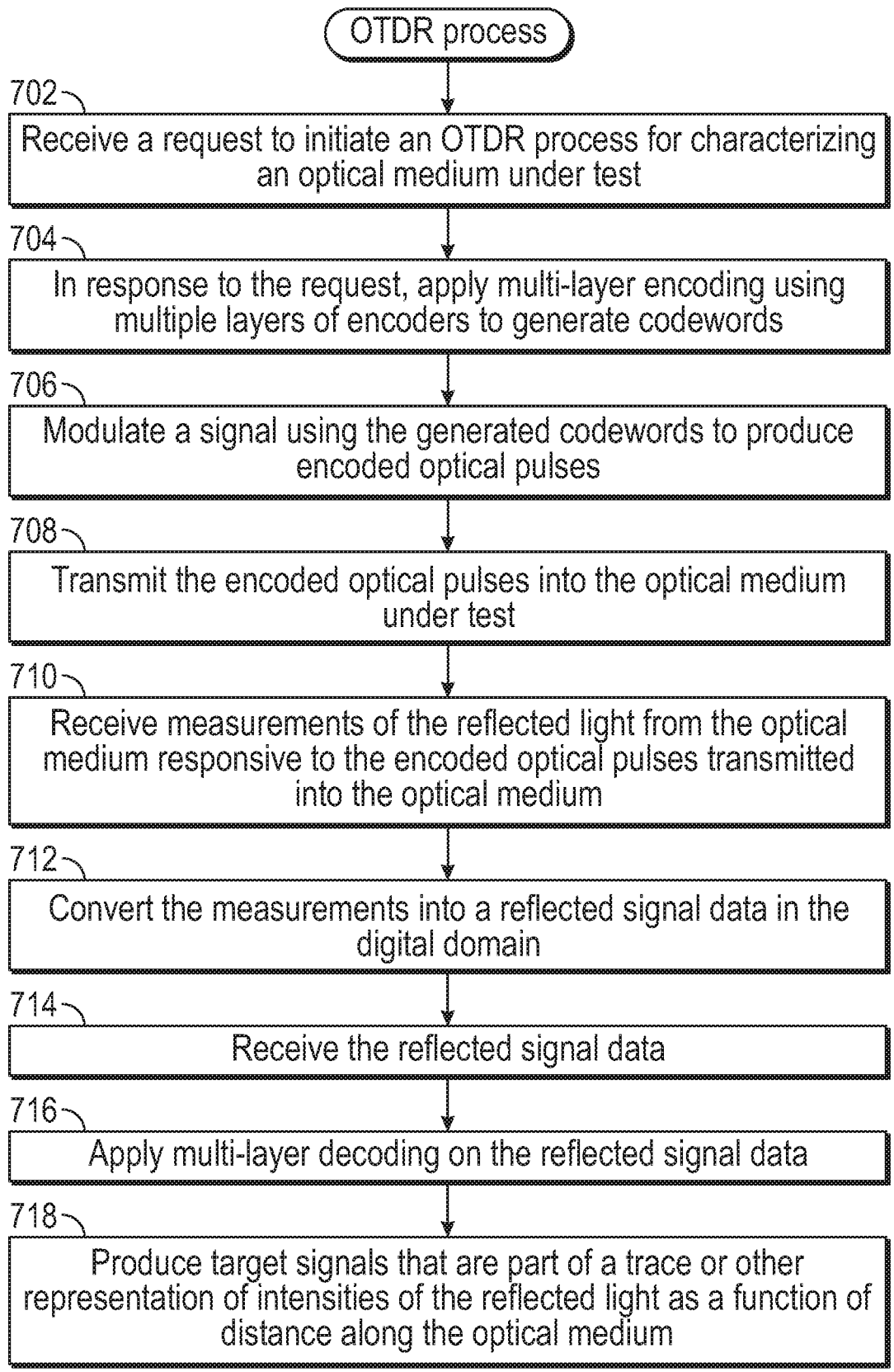
FIG. 7 is a flow diagram of a process of an OTDR according to some implementations of the present disclosure.

FIG. 7 is a flow diagram of a process performed by an OTDR (e.g., 102 in FIG. 1) according to some implementations of the present disclosure. The OTDR receives (at 702) a request to initiate an OTDR process for characterizing an optical medium under test. For example, the request can be in response to a user activating a control element in a GUI (e.g., 140 in FIG. 1) displayed by a display device. As another example, the request can be submitted from a remote device.

In response to the request, a multi-layer encoder (e.g., 107 in FIG. 1) in the OTDR applies (at 704) multi-layer encoding using multiple layers of encoders to generate codewords. A modulator (e.g., 112 in FIG. 1) modulates (at 706) a signal using the generated codewords to produce encoded optical pulses. An optical coupler (e.g., 116 in FIG. 1) transmits (at 708) the encoded optical pulses into the optical medium under test.

The encoded optical pulses are propagated along the length of the optical medium. In response to the encoded optical pulses, light is reflected from different points along the optical medium.

An optical receiver (e.g., 124 in FIG. 1) receives (at 710) measurements of the reflected light from the optical medium responsive to the encoded optical pulses transmitted into the optical medium. The optical receiver converts (at 712) the measurements into a reflected signal data (e.g., 132 in FIG. 1) in the digital domain.

The reflected signal data is received (at 714) by a trace generator (e.g., 134 in FIG. 1). A multi-layer decoder (e.g., 135 in FIG. 1) in the trace generator applies (at 716) multi-layer decoding on the reflected signal data. The multi-layer decoding produces (at 718) target signals that are part of a trace or other representation of intensities of the reflected light as a function of distance along the optical medium.

Figure 8:
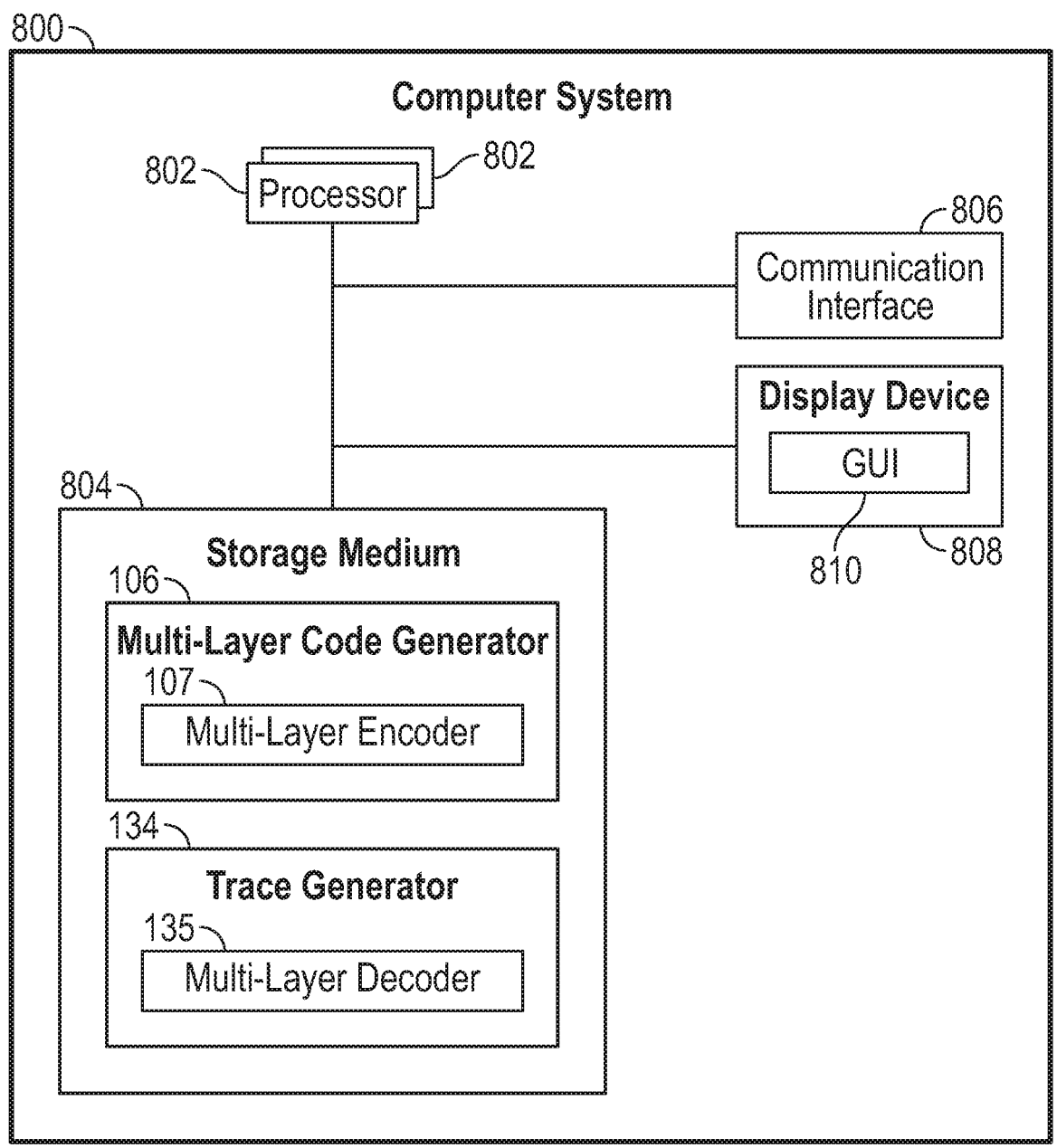
FIG. 8 is a block diagram of a computer system according to some implementations of the present disclosure.

FIG. 8 is a block diagram of a computer system 800, which can be part of the OTDR 102 (or be coupled to the OTDR 102). The computer system 800 can be implemented using a single computing node, or multiple distributed computing nodes.

The computer system 800 includes one or more hardware processors 802. A hardware processor can include a microprocessor, a core of a multi-core microprocessor, a microcontroller, a programmable integrated circuit, a programmable gate array, a digital signal processor, or another hardware processing circuit.

The computer system 800 further includes a non-transitory machine-readable or computer-readable storage medium 804. The storage medium 804 stores machine-readable instructions executable on the one or more hardware processors 802.

For example, the multi-layer generator 106 and the trace generator 134 can be implemented as machine-readable instructions stored in the storage medium 804.

The computer system 800 further includes a communication interface 806 to communicate over a network or another communication link. The communication interface 806 can include a transceiver to transmit and receive data. In addition, the communication interface 806 can include protocol layers to implement communication protocols governing communications over the network or another communication link. In some examples, the communication interface 806 can be connected to a communication link connected to an optical receiver (e.g., 124 in FIG. 1, to receive reflected signal data representing measurements of reflected light from an optical medium under test.

The computer system 800 can also include a display device 808, which can include a GUI 810 to display a trace generated by the trace generator 134, and control elements that are selectable to initiate or control an OTDR process.

The storage medium 804 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital versatile disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:
   a multi-layer code generator to generate codewords based on application of a plurality of layers of encoding, wherein the plurality of layers of encoding comprises:
      a first layer encoding, using a first collection of multiple codes, of an input signal, and
      a second layer encoding, using a second collection of multiple codes, of an encoded output of the first layer encoding;
   an optical source to produce encoded optical pulses based on the generated codewords; and
   an optical coupler to propagate the encoded optical pulses to an optical medium.

2. The apparatus of claim 1, wherein the plurality of layers of encoding comprises a sequence of different layers of encoding in which an output of one layer of encoding is provided to an input of another layer of encoding.

3. The apparatus of claim 1, wherein the plurality of layers of encoding further comprises a third layer encoding, using a third collection of one or more codes, of an encoded output of the second layer encoding.

4. The apparatus of claim 1, wherein the first layer encoding uses first type codes in the first collection of multiple codes, and the second layer encoding uses second type codes in the second collection of multiple codes, the second type codes different from the first type codes.

5. The apparatus of claim 1, wherein the encoded output of the first layer encoding comprises a first set of codewords, and the second layer encoding is to encode each codeword of the first set of codewords to produce a second set of codewords that is larger than the first set of codewords.

6. The apparatus of claim 1, further comprising a modulator to modulate a signal using the generated codewords to produce the encoded optical pulses.

7. The apparatus of claim 1, further comprising:
   an optical receiver to receive reflected light from the optical medium through the optical coupler; and
   a decoder to decode measurements of the reflected light from the optical receiver using a plurality of layers of decoding.

8. The apparatus of claim 7, wherein the plurality of layers of decoding comprises a first layer decoding that decodes the measurements, and a second layer decoding that decodes a decoded output of the first layer decoding.

9. The apparatus of claim 8, wherein the plurality of layers of decoding further comprises a third layer decoding that decodes a decoded output of the second layer decoding.

10. The apparatus of claim 7, wherein the decoder is to produce an output that includes a representation of intensities of the reflected light as a function of distance along the optical medium.

11. The apparatus of claim 7, wherein a layer of the plurality of layers of encoding applies a coding technique selected from among: complementary correlation coding, linear coding, mutual orthogonal coding, and bi-orthogonal coding.

12. An apparatus comprising:
an interface to receive, from an optical receiver, data representing measurements of reflected light that is responsive to encoded optical pulses transmitted into an optical medium; and
a processor to:
decode the data using a plurality of layers of decoding to recover a target signal that is part of a representation of intensities of reflected light as a function of distance along the optical medium, wherein the plurality of layers of decoding comprises:
a first layer decoding that decodes, using a first collection of multiple codes, the data, and
a second layer decoding that decodes, using a second collection of multiple codes, a decoded output of the first layer decoding.

13. The apparatus of claim 12, wherein the plurality of layers of decoding comprises a sequence of different layers of decoding in which an output of one layer of decoding is provided to an input of another layer of decoding.

14. The apparatus of claim 12, wherein the plurality of layers of decoding further comprises a third layer decoding that decodes, using a third collection of one or more codes, a decoded output of the second layer decoding.

15. The apparatus of claim 12, wherein the decoded output of the first layer decoding comprises a first set of codewords, and the second layer decoding is to generate a decoded output comprising a second set of codewords that is smaller than the first set of codewords.

16. The apparatus of claim 15, wherein a last layer of the plurality of layers of decoding produces the target signal.

17. A method performed by an optical time domain reflectometer (OTDR), comprising:
generating codewords based on application of a plurality of layers of encoding, wherein the plurality of layers of encoding comprises:
a first layer encoding, using a first collection of multiple codes, of an input signal, and
a second layer encoding, using a second collection of multiple codes, of an encoded output of the first layer encoding;
modulating a signal using the codewords to produce encoded optical pulses;
transmitting the encoded optical pulses into an optical medium;
receiving measurements of reflected light from the optical medium responsive to the encoded optical pulses transmitted into the optical medium;
decoding the measurements using a plurality of layers of decoding; and
producing, based on an output of the decoding, a representation of intensities of the reflected light as a function of distance along the optical medium.

18. The method of claim 17, wherein the plurality of layers of encoding comprises a sequence of different layers of encoding in which an output of one layer of encoding is provided to an input of another layer of encoding.

19. The apparatus of claim 1, wherein the first collection of multiple codes includes a code of a first length, and the second collection of multiple codes includes a code of a second length different from the first length.

20. The apparatus of claim 1, wherein the first layer encoding performs convolution of the input signal and the first collection of multiple codes, and the second layer encoding performs convolution of the encoded output of the first layer encoding and the second collection of multiple codes.

* * * * *